United States Patent Office 2,912,300
Patented Nov. 10, 1959

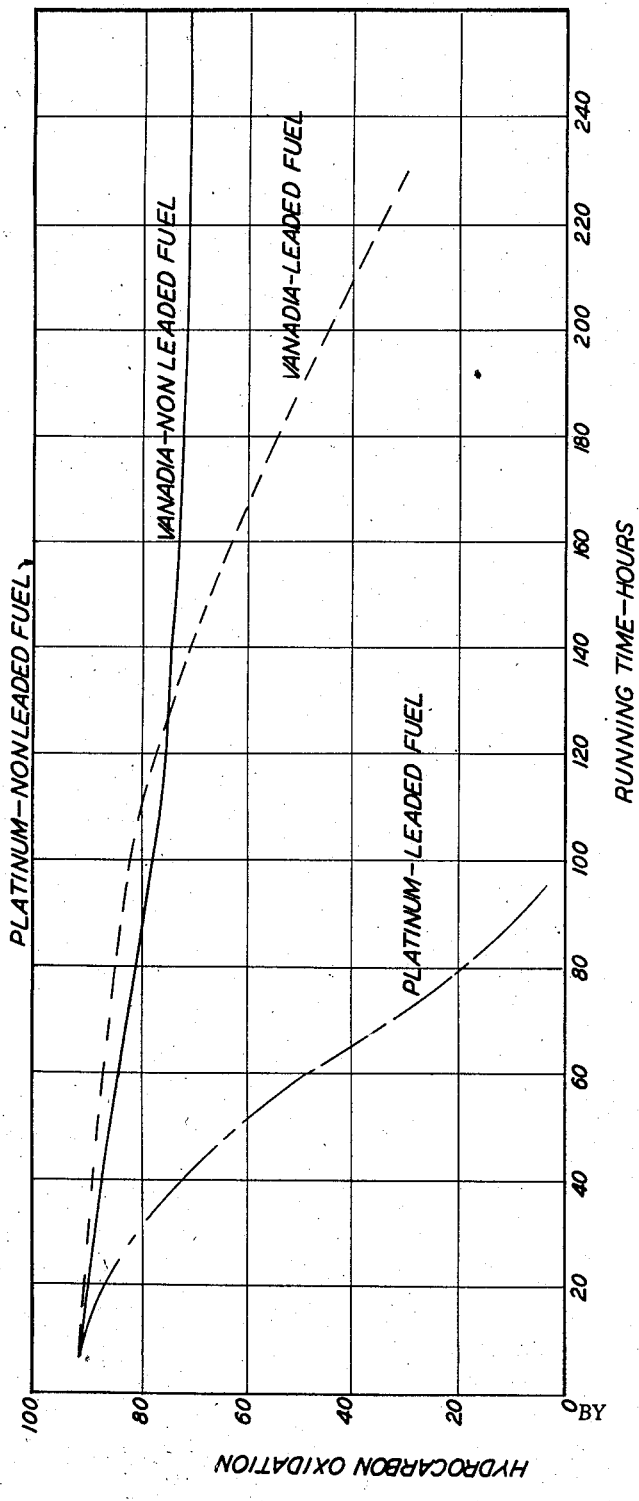

2,912,300

METHOD OF SELECTIVELY OXIDIZING HYDROCARBONS IN EXHAUST GASES OF INTERNAL COMBUSTION ENGINES

William A. Cannon, Wyandotte, and Charles E. Welling, Dearborn, Mich., assignors to Ford Motor Company, Dearborn, Mich., a corporation of Delaware Application May 27, 1957, Serial No. 661,860

2 Claims. (Cl. 23—2)

The object of this invention is to provide a process for the selective oxidation of the hydrocarbons which are present in the exhaust gas of internal combustion engines. This oxidation is to be accomplished without substantial oxidation of the carbon monoxide and hydrogen which are almost invariably present in internal combustion engine exhaust. It is desirable to rid internal combustion engine exhaust of substantially all unburned hydrocarbons because of the accumulation of evidence that these unburned hydrocarbons are directly responsible for the disagreeable physiological effects which have been termed "smog."

The chemical composition of the exhaust of internal combustion engines varies over a wide range, depending upon such variables as speed, load, engine temperature, carburetor setting etc. The concentrations of hydrocarbons in internal combustion engine exhaust gas ranges from 0.01 percent to as high as 1 percent by volume. The chief other combustible constituent of the exhaust stream is carbon monoxide and this component ranges from as high as 6 percent or more to as low as 0.5 percent by volume.

While at first blush it would seem simpler to simultaneously oxidize all of the combustible constituents in the exhaust gas, including the carbon monoxide, there are many advantages to be gained by selectively oxidizing only the hydrocarbons. Some of these advantages are:

(1) Operation at lower temperatures allows use of cheaper materials of construction for the catalyst container.

(2) Operation of the catalyst at lower temperatures is conducive to longer life of the catalyst.

(3) Less oxygen via secondary air is required for oxidation of the hydrocarbons alone and provision of sufficient secondary air is simplified.

(4) With a lesser volume of secondary air the total mass flow is minimized and the space limitations involved in vehicular operations are most readily met.

(5) The problem of dissipation of heat from the catalytic device is minimized.

A suitable catalyst for the selective oxidation of the combustible constituents of internal combustion exhaust gases must selectively oxidize hydrocarbons and must be resistant to poisoning by the lead compounds which originate in the tetraethyl lead employed as an anti-knock additive in practically all commercially obtainable motor fuels.

Our investigations have disclosed that a catalyst comprising from 5 percent to 10 percent vanadium pentoxide supported upon a suitable alumina carrier combines these desirable properties to a large extent. The carrier should be a medium to high area gamma alumina presenting a surface area in excess of 75 square meters per gram and a pore volume in excess of 0.28 milliliter per gram.

A suitable catalyst may be prepared as follows:

Mix and heat on a steam bath 21 parts of ammonium meta-vanadate and 15 parts of water. Add 34 parts of oxalic acid to the paste gradually and continue heating until the evolution of carbon dioxide has subsided, after which add 8.5 parts concentrated ammonium hydroxide. Add to the solution 25 parts of pelleted or granular gamma alumina with minimum surface area of 50 m.²/g. and evaporate the whole slowly to dryness while stirring constantly. Screen the fines from the prepared catalyst and ignite in air at a temperature of 400° C. for four hours to activate the catalyst.

Catalysts so prepared initiate the oxidation of unburned hydrocarbons at approximately 100° C., and the oxidation of the hydrocarbons is complete at a temperature not substantially higher than 400° C. These temperatures are measured in the effluent stream from the catalyst chamber.

These catalysts were tested by the exhaust of a single cylinder Lauson engine in which the operating cycle was alternated between 90 seconds open throttle and 20 seconds closed throttle. In each instance the speed was approximately 1800 revolutions per minute. The operating parameters of this test are summarized below.

| | Closed Throttle | Open Throttle |
|---|---|---|
| Volume exhaust gas from engine (1 atm. and room temperature)_____c.f.m__ | 0.3 | 1.5 |
| Volume secondary air (1 atm. and room temperature)_____c.f.m__ | 0.35 | 0.35 |
| Total volume gas fed to catalyst chamber (1 atm. and room temperature)_____c.f.m__ | 0.65 | 1.85 |
| Hydrocarbon (vol. percent)_____ | 0.20 | 0.03 |
| $CO_2$ (vol. percent)_____ | 3.0 | 11.0 |
| CO (vol. percent)_____ | 1.0 | 2.0 |
| $O_2$ (vol. percent)_____ | 8.0 | 4.0 |
| Standard hourly space velocity (V./V./hr.)_____ | 3,300 | 10,000 |

The results of this work are depicted graphically in the figure of drawing. In this figure the percentage of oxidation of the hydrocarbons is plotted against running time. It will be noted that a platinum containing catalyst with a non-leaded fuel maintained perfect hydrocarbon oxidation throughout the life of the test. However, the platinum containing catalyst operating upon leaded fuel rapidly deteriorated and was effectively dead at 100 hours. The vanadium oxide base catalyst operating upon non-leaded fuel varied from an efficiency of about 95 percent to an efficiency of about 70 percent in 250 hours. The vanadium oxide catalyst operating upon leaded fuels deteriorated from 95 percent to 30 percent in about the same length of time. Each of the leaded fuels were prepared by adding 3 cc. per gallon of tetraethyl lead to a gallon of unleaded fuel. The attached table has been presented to demonstrate the operation and selectivity of vanadium pentoxide catalysts as compared to conventional chrome based catalysts for the same purpose.

| Test No. | Catalyst | Wt. Catalyst (g.) | Vol. Catalyst (ml.) | Gas Composition, Percent by Vol. | | | | | Std. Hr. Gas Space Veloc. | Inlet Gas Temp. to Catalyst Bed, ° C. | |
|---|---|---|---|---|---|---|---|---|---|---|---|
| | | | | $O_2$ | CO | $CO_2$ | $H_2$ | Gasoline | | Treshhold Oxidation | Complete Oxidation |
| 3-00513-11-2 | Harshaw Vanadium Pentoxide on Alumina V-0301T-1/S. | 50.5 | 50 | 4.0 | 0 | 13.3 | 0 | 0.10 | 5,400 | 160 | 275. |
| 3-00513-12-1 | ----do---- | 26 | 25 | 4.0 | 0 | 13.3 | 0 | 0.10 | 10,800 | 180 | 275. |
| 3-00513-23-1 | ----do---- | 25 | 25 | 4.0 | 3.0 | 12.7 | 1.0 | 0.24 | 5,500 | 150 | 250 Hydro. only. |
| 3-00513-22 | ----do---- | 26 | 25 | 4.1 | 3.0 | 12.7 | 1.0 | 0 | 5,700 | 400 | Incomp. at 480 (CO + $H_2$ only). |
| 3-00649-8-2 | Vanadium Pentoxide on Harshaw Alumina AL-0104-3/16″, Lab. Prep. 3-00649-4-2. | 22 | 25 | 4.0 | 0 | 12.7 | 0 | 0.24 | 5,500 | 160 | 290. |
| 3-00715-12-2 | Vanadium Pentoxide on Norton LA-561 Support Lab Prep. 3-00715-1-2. | 26 | 25 | 4.4 | 0 | 12.7 | 0 | 0.24 | 5,500 | 150 | 295. |
| 3-01181-6-1 | Harshaw Chrome Alumina CR-0103T-1/S. | 24 | 25 | 3.9 | 3.6 | 12.1 | 0 | 0 | 5,700 | 350 | 400. |
| 3-01181-6-2 | ----do---- | 24 | 25 | 4.0 | 0 | 12.0 | 0 | 0.23 | 5,500 | 316 | 367. |

All runs made with approx. 10% by volume water vapor added and the balance of gas is nitrogen. Indolene Clear gasoline used.

Attention is particularly invited to the high oxidation thresholds experienced by the chrome based catalysts either with or without unburned hydrocarbons being present.

We claim as our invention:

1. The process of at least partially eliminating unburned hydrocarbons from the exhaust stream of an internal combustion engine without substantially effecting the carbon monoxide and hydrogen content of said stream comprising passing said stream in the presence of oxygen over a catalyst bed comprising vanadium pentoxide supported upon a suitable carrier and limiting the temperature of the gas stream to a value between 100° C. and 400° C. to insure at least partial elimination of the unburned hydrocarbons by oxidation without the concomitant oxidation of other combustibles in the exhaust stream.

2. The process of at least partially eliminating unburned hydrocarbons from the exhaust stream of an internal combustion engine without substantially effecting the carbon monoxide and hydrogen content of said stream comprising passing said stream in the presence of oxygen over a catalyst bed comprising from 5 percent to 10 percent of vanadium pentoxide supported upon a gamma alumina base and limiting the temperature of the gas stream to a value between 100° C. and 400° C. to insure at least partial elimination of the unburned hydrocarbons by oxidation without the concomitant oxidation of other combustibles in the exhaust stream.

References Cited in the file of this patent

UNITED STATES PATENTS 2,510,803    Cooper               June 6, 1950

FOREIGN PATENTS 312,200    Great Britain        May 21, 1929
413,744    Great Britain        July 26, 1934